US010030777B2

(12) United States Patent
Rippel et al.

(10) Patent No.: US 10,030,777 B2
(45) Date of Patent: Jul. 24, 2018

(54) DYNAMIC FLUID SEAL (71) Applicant: PRIPPELL TECHNOLOGIES, LLC, Los Angeles, CA (US)

(72) Inventors: Wally E. Rippel, Altadena, CA (US); Eric E. Rippel, Los Angeles, CA (US)

(73) Assignee: Prippell Technologies, LLC, Los Angeles, CA (US)

( * ) Notice: Subject to any disclaimer, the term of this patent is extended or adjusted under 35 U.S.C. 154(b) by 0 days.

(21) Appl. No.: 15/485,107

(22) Filed: Apr. 11, 2017

(65) Prior Publication Data
US 2017/0292612 A1 Oct. 12, 2017

Related U.S. Application Data (60) Provisional application No. 62/321,139, filed on Apr. 11, 2016.

(51) Int. Cl.
F16J 15/00 (2006.01)
F16J 15/447 (2006.01)
F16J 15/32 (2016.01)
F16C 33/78 (2006.01)
F16C 33/80 (2006.01)
F16J 15/44 (2006.01)
F16J 15/3232 (2016.01)

(52) U.S. Cl.
CPC .......... F16J 15/44 (2013.01); F16C 33/7896 (2013.01); F16C 33/805 (2013.01); F16J 15/002 (2013.01); F16J 15/004 (2013.01); F16C 33/80 (2013.01); F16J 15/3232 (2013.01); F16J 15/4472 (2013.01)

(58) Field of Classification Search
CPC ...... F16J 15/002; F16J 15/004; F16J 15/3232; F16J 15/40; F16J 15/406; F16J 15/447; F16J 15/4472; F16C 33/7823; F16C 33/7896; F16C 33/80; F16C 33/805
See application file for complete search history.

(56) References Cited

U.S. PATENT DOCUMENTS

| 4,114,058 A | 9/1978 | Albaric | |
| 4,413,829 A * | 11/1983 | Pietsch | B63H 23/321 277/504 |
| 5,137,116 A * | 8/1992 | Von Bergen | B63H 23/321 184/104.1 |

(Continued)

OTHER PUBLICATIONS

Ludwig, L.P. et al., "Sealing Technology for Aircraft Gas Turbine Engines", NASA Technical Memorandum, NASA TM X-71607, 10th Propulsion Conference sponsored by American Institute of Aeronautics and Astronautics and Society of Automotive Engineers, Oct. 21-24, 1974, 16 pages, San Diego, California.

(Continued)

Primary Examiner — Nicholas L Foster
(74) Attorney, Agent, or Firm — Lewis Roca Rothgerber Christie LLP (57) ABSTRACT A low drag fluid seal. The fluid seal includes a rigid lip separated from the rotor shaft by a gap, the gap being sufficient narrow, radially, to prevent liquid from seeping through the gap at an unacceptable rate, but sufficiently wide, radially, to avoid unacceptably high viscous drag. Fluid that seeps through the gap accumulates in a recovery cavity and is recovered by a scavenge pump.

20 Claims, 8 Drawing Sheets (56) References Cited

U.S. PATENT DOCUMENTS

| | | | | |
|---|---|---|---|---|
| 5,147,494 A * | 9/1992 | Torii | ..................... | B60C 23/003 |
| | | | | 156/417 |
| 5,219,434 A * | 6/1993 | Von Bergen | ......... | F16J 15/3456 |
| | | | | 210/171 |
| 5,643,026 A * | 7/1997 | Pietsch | ................ | B63H 23/321 |
| | | | | 277/320 |
| 5,836,753 A * | 11/1998 | Takei | ...................... | F02B 33/36 |
| | | | | 418/104 |
| 6,095,780 A * | 8/2000 | Ernens | ................... | F16J 15/002 |
| | | | | 277/351 |
| 6,575,269 B1 * | 6/2003 | Skoff | .................... | B60C 23/003 |
| | | | | 152/416 |
| 7,396,017 B2 * | 7/2008 | Orlowski | ................ | F16J 15/187 |
| | | | | 277/412 |
| 9,316,320 B2 * | 4/2016 | Cho | ........................ | F16J 15/002 |
| 2010/0119368 A1 * | 5/2010 | Fos | ......................... | F16J 15/002 |
| | | | | 415/230 |
| 2011/0148048 A1 * | 6/2011 | Grosser | ................. | F16J 15/002 |
| | | | | 277/628 |
| 2013/0062976 A1 | 3/2013 | Rai et al. | | |
| 2015/0280525 A1 * | 10/2015 | Rippel | ..................... | H02K 9/19 |
| | | | | 310/54 |
| 2017/0122435 A1 * | 5/2017 | Molina | .................. | F16J 15/002 |

OTHER PUBLICATIONS

International Search Report and Written Opinion of the International Searching Authority, dated Jun. 26, 2017, Corresponding to PCT/US2017/027059, 9 pages.

\* cited by examiner

DYNAMIC FLUID SEAL

CROSS-REFERENCE TO RELATED APPLICATION(S)

The present application claims priority to and the benefit of U.S. Provisional Application No. 62/321,139, filed Apr. 11, 2016, entitled "DYNAMIC FLUID SEAL", the entire content of which is incorporated herein by reference.

FIELD

One or more aspects of embodiments according to the present invention relate to fluid seals, and more particularly to fluid seals for use in systems with high rates of rotation.

BACKGROUND

Rotary shaft seals enable a rotating shaft to pass through an enclosure while blocking the flow of a fluid such as oil or water. In some systems an elastomer of annular shape provides the required sealing function; such seals are commonly referred to as lip seals. For applications where the shaft surface speeds are relatively low (e.g. less than 2 m/second), such seals may perform adequately. However, for high speed applications (e.g. greater than 20 m/second), lip seals may encounter several problems, including that (i) drag and drag related losses may become excessive, especially when sealing against liquid pressures which are more than a few kPa, (ii) temperature rise may become excessive, and (iii) the service life of the lip seal may become unacceptably short.

Thus, there is a need for an improved seal for a rotating shaft.

SUMMARY

Aspects of embodiments of the present disclosure are directed toward a low drag fluid seal for an electric motor rotor. In a first embodiment, the fluid seal includes a rigid lip separated from the rotor shaft by a gap, the gap being sufficient narrow, radially, to prevent liquid from seeping through the gap at an unacceptable rate, but sufficiently wide, radially, to avoid unacceptably high viscous drag. Fluid that seeps through the gap accumulates in a recovery cavity and is recovered by a scavenge pump. In a second embodiment, the fluid seal includes a rigid lip separated from the rotor shaft by a gap, the gap being sufficiently narrow, radially, to prevent liquid from seeping through the gap at an unacceptable rate, but sufficiently wide, radially, to avoid unacceptably high viscous drag. Fluid that seeps through the gap accumulates in a recovery cavity and is recovered by action of positive air pressure adjacent to the recovery cavity.

According to an embodiment of the present invention there is provided a rotary fluid coupling system for a rotor shaft, including: a first fluid seal around the rotor shaft, the first fluid seal including: a first fluid-side lip surrounding the rotor shaft on a fluid side of the first fluid seal; a first air-side lip surrounding the rotor shaft on an air side of the first fluid seal; and a first recovery cavity, positioned between the first fluid-side lip and the first air-side lip, configured to recover fluid escaping through a first fluid-side gap between the first fluid-side lip and the rotor shaft.

In one embodiment, the rotary fluid coupling system includes: a second fluid seal around the rotor shaft; and a fluid cavity between the first fluid seal and the second fluid seal, the second fluid seal including: a second fluid-side lip surrounding the rotor shaft on a fluid side of the second fluid seal; a second air-side lip surrounding the rotor shaft on an air side of the second fluid seal; and a second recovery cavity, positioned between the second fluid-side lip and the second air-side lip, configured to recover fluid escaping through a second fluid-side gap between the second fluid-side lip and the rotor shaft.

In one embodiment, the first fluid seal further includes: a first compressed air lip surrounding the rotor shaft on an air side of the first air-side lip; and a first compressed air cavity, between the first compressed air lip and the first air-side lip, the first compressed air cavity being in fluid communication with a source of compressed air.

In one embodiment, the first fluid-side lip is a rigid lip; and the first compressed air lip is a flexible lip configured to flex away from the rotor shaft to form a first air-side gap between the first compressed air lip and the rotor shaft when compressed air is present in the first compressed air cavity; and to contact the rotor shaft when compressed air is not present in the first compressed air cavity.

In one embodiment, the rotary fluid coupling system includes: a second fluid seal around the rotor shaft, the second fluid seal including: a second fluid-side lip surrounding the rotor shaft on a fluid side of the second fluid seal; a second air-side lip surrounding the rotor shaft on an air side of the second fluid seal; and a second recovery cavity, positioned between the second fluid-side lip and the second air-side lip, configured to recover fluid escaping through a second fluid-side gap between the second fluid-side lip and the rotor shaft; a second compressed air lip surrounding the rotor shaft on an air side of the second air-side lip; and a second compressed air cavity, between the second compressed air lip and the second air-side lip, the second compressed air cavity being in fluid communication with the source of compressed air.

In one embodiment, the rotary fluid coupling system includes a bearing, on the rotor shaft, between the second fluid-side lip and the second air-side lip.

In one embodiment, the rotary fluid coupling system includes a third compressed air cavity between the second fluid-side lip and the bearing, the third compressed air cavity being in fluid communication with the source of compressed air.

In one embodiment, the rotary fluid coupling system includes a scavenge pump having an inlet in fluid communication with the first recovery cavity.

In one embodiment, the first fluid-side lip is a rigid lip, separated from the rotor shaft by a first fluid-side gap extending axially to form a first sealing region.

In one embodiment, the first air-side lip is a flexible lip configured: to flex away from the rotor shaft to form a first air-side gap between the first air-side lip and the rotor shaft when a pressure difference exists between the air side of the first air-side lip and the fluid side of the first air-side lip, the pressure on the air side of the first air-side lip being greater than the pressure on the fluid side of the first air-side lip; and to contact the rotor shaft when the pressure on the air side of the first air-side lip is not greater than the pressure on the fluid side of the first air-side lip.

In one embodiment, the rotary fluid coupling system includes: a scavenge pump; a fluid-air separator; and a main pump, wherein the scavenge pump is configured to pump fluid and/or air from the first recovery cavity into the fluid-air separator, and wherein the main pump is configured to pump fluid from the fluid-air separator.

In one embodiment, the first fluid-side gap has a radial dimension greater than 0.005 mm and less than 0.5 mm; and an axial dimension greater than 0.5 mm and less than 20 mm; and the rotor shaft has a diameter greater than 5 mm and less than 100 mm.

According to an embodiment of the present invention there is provided an electric machine including: a rotor having a plurality of fluid passages and a rotor shaft, the a rotor shaft having an axial hole in fluid communication with the fluid passages; and a first rotary fluid coupling, the first rotary fluid coupling including: a first fluid seal around the rotor shaft, a second fluid seal around the rotor shaft; and a first fluid cavity between the first fluid seal and the second fluid seal, the first fluid seal including: a first fluid-side lip surrounding the rotor shaft on a fluid side of the first fluid seal; a first air-side lip surrounding the rotor shaft on an air side of the first fluid seal; and a first recovery cavity, positioned between the first fluid-side lip and the first air-side lip, configured to recover fluid escaping through a first fluid-side gap between the first fluid-side lip and the rotor shaft; the second fluid seal including: a second fluid-side lip surrounding the rotor shaft on a fluid side of the second fluid seal; a second air-side lip surrounding the rotor shaft on an air side of the second fluid seal; and a second recovery cavity, positioned between the second fluid-side lip and the second air-side lip, configured to recover fluid escaping through a second fluid-side gap between the second fluid-side lip and the rotor shaft, the first fluid cavity being in fluid communication with the axial hole in the rotor shaft.

In one embodiment, the first fluid cavity is in fluid communication with the axial hole in the rotor shaft through a radial hole in the rotor shaft.

In one embodiment, the first fluid seal further includes: a first compressed air lip surrounding the rotor shaft on an air side of the first air-side lip; and a first compressed air cavity, between the first compressed air lip and the first air-side lip, the first compressed air cavity being in fluid communication with a source of compressed air; and the second fluid seal further includes: a second compressed air lip surrounding the rotor shaft on an air side of the second air-side lip; and a second compressed air cavity, between the second compressed air lip and the second air-side lip, the second compressed air cavity being in fluid communication with the source of compressed air.

In one embodiment, the electric machine includes an air pump having an outlet in fluid communication with the first compressed air cavity and the second compressed air cavity.

In one embodiment, the electric machine includes: a second rotary fluid coupling in fluid communication with the fluid passages of the rotor; and a main pump, configured to pump fluid through the first rotary fluid coupling, the fluid passages of the rotor, and the second rotary fluid coupling.

In one embodiment, the electric machine includes a fluid reservoir, wherein the main pump is configured to draw fluid from the fluid reservoir.

In one embodiment, the electric machine includes: a third fluid-side lip surrounding the rotor shaft on a fluid side of the third fluid seal; a third air-side lip surrounding the rotor shaft on an air side of the third fluid seal; and a third recovery cavity, positioned between the third fluid-side lip and the third air-side lip, configured to recover fluid escaping through a third fluid-side gap between the third fluid-side lip and the rotor shaft.

In one embodiment, the second rotary fluid coupling further includes: a third compressed air lip surrounding the rotor shaft on an air side of the third air-side lip; and a third compressed air cavity, between the third compressed air lip and the third air-side lip, the third compressed air cavity being in fluid communication with a source of compressed air.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a dynamic fluid seal provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
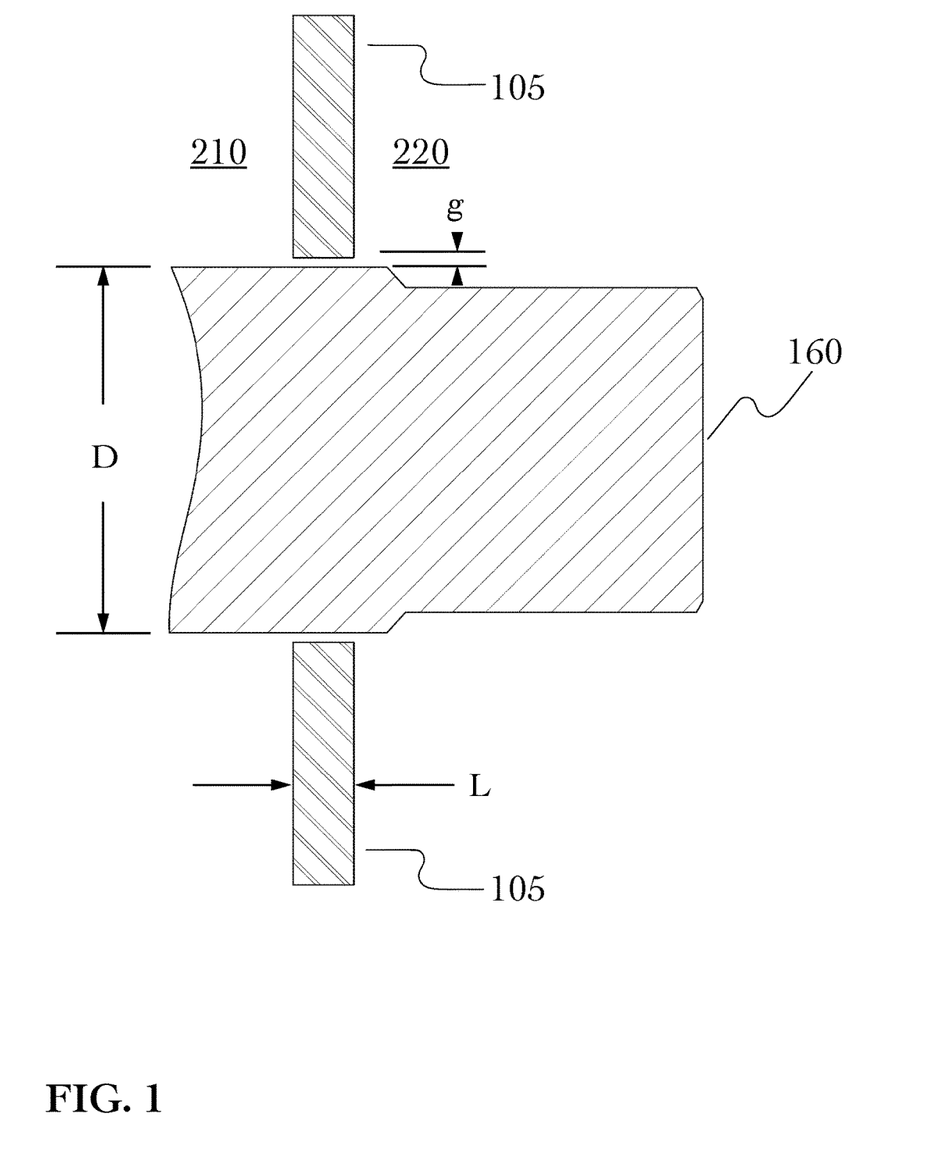
FIG. 1 is a schematic cross-sectional view of rigid lip seal, according to an embodiment of the present invention.

FIG. 1 shows a fluid seal 105 around a shaft 160. In some embodiments liquid is present on a fluid side 210 of the seal, and air is present on an air side 220 of the seal (for example, as a result of the air side being open to the atmosphere). In other embodiments, fluid (e.g., fluid at two different pressures) may be present on both sides of the fluid seal 105, or air (e.g., air at two different pressures) may be present on both sides of the fluid seal 105. Drag may be due mainly to fluid viscosity effects in the thin fluid layer between the respective surfaces of the fluid seal 105 and shaft 160. In FIG. 1, D is the shaft diameter, g is the thickness of the fluid layer (i.e., the radial dimension of the gap between the lip of the seal and the outer surface of the shaft 160), L is the length of the contact (or near-contact) region (i.e., the axial extent of the gap), $\mu$ is the fluid dynamic viscosity, and $\omega$ is the angular shaft speed. The shaft surface speed is equal to $(\frac{1}{2})\omega D$. Viscous shear pressure is equal to dynamic viscosity times the gradient of shear velocity, or $(\frac{1}{2}) \mu \omega D/g$. The tangential drag force, $F_t$, is equal to the shear pressure times the contact area. Hence, $F_t=(\pi/2)\mu\omega D^2 L/g$. The drag torque, $T_d$, is $D/2$ times the tangential drag force. Hence:

$$T_d=(\pi/4)\mu\omega D^3 L/g. \qquad (1)$$

To reduce the drag torque, D, or L, or both, may be made as small as possible, and g may be made as large as possible. D may however be constrained to be adequately large to safely handle maximum torque levels and to meet stiffness requirements. While L, the length of the contact (or near-contact) region, may be held to a relatively small value, there are practical limits based on seal life and fabrication capabilities, and as the seal wears, L may increase. For a conventional flexible lip seal, g is inherently small and is based on inherent surface and fluid properties (g may be on the order of a few microns). If g is in some way forced to increase beyond these values, fluid leakage may occur.

Providing seals for liquid-cooled, high-speed, electric motor rotors may be challenging. To inject and recover coolant (i.e., cooling fluid) from the rotor, typically four seals are required. Furthermore, for such motors, the space available for seals may be quite small. Some embodiments address the challenges present in such motors, and provide a shaft seal which produces relatively low drag for high speed applications (e.g., less than 0.02 Nm for a 25 mm diameter shaft rotating at 20,000 rpm with fluid head of 70 kPa or greater).

From Equation (1) it may be seen that as g (the radial dimension of the gap) is increased, drag torque is reciprocally reduced. As g is increased beyond the micron range, however, leakage may occur. Accordingly, some embodiments provide a seal for which the drag is relatively small and the fluid leakage rate is nonetheless sufficiently small that the pumping power associated with leak recovery is acceptable. The ratio between the head loss associated with inertial effects and head loss associated with viscous effects may be known as the Reynolds number. When the Reynolds number is much larger than unity, the head loss may be due mainly to inertial effects, and viscosity may be neglected. When the Reynolds number is small compared with unity, the reverse may be true, and flow may be calculated based on viscosity, while neglecting inertial effects. For a fluid seal, the Reynolds number may be on the order of 0.001 and hence a viscosity-based calculation may be used.

The following equation may be used to calculate the leakage flow, F, as a function of the fluid pressure, P, across the seal, the fluid viscosity, μ, and the geometric parameters shown FIG. 1:

$$F=(\pi/12)Dg^3P/(\mu L) \qquad (2)$$

A seal may then be designed, and/or its characteristics may be analyzed, using Equation (1) and Equation (2). For example, the following parameters may be applicable to one embodiment:

D=25 mm=0.025 m
L=2.54 mm=0.00254 m
P=10 psi=70,000 Pa
$\mu_1$=0.05 Pa-seconds (which may correspond to the dynamic viscosity of automatic transmission fluid (ATF) at 20° C.)
$\mu_2$=0.01 Pa-seconds (which may correspond to the dynamic viscosity of automatic transmission fluid at 60° C.)

For these parameters, the worst case drag may be calculated using Equation (1), using the higher value of viscosity, i.e., using $\mu_1$, which is for automatic transmission fluid at 20° C. Assuming that the maximum acceptable drag torque at 20,000 rpm (2093 rad/second) is 0.05 Nm, solving Equation (1) for g under these conditions provides g =0.0684 mm (0.00269"). For higher temperatures, coolant viscosity and drag may be less. The worst case leakage may take place when the coolant is at maximum temperature (e.g., at 60° C.), at which the dynamic velocity may be $\mu_2$=0.01 Pa-seconds. Using this viscosity, setting g equal to 0.0684 mm, and setting P=70,000 Pa, Equation (2) provides a flow rate of 0.00000586 m/second =0.35 liters per minute. This flow rate may be handled by a small pump. The theoretical pumping power (i.e., the power required to pump the fluid across the 70,000 Pa head) is only 0.41 W. At lower heads and lower temperatures, flow and pumping power may be even less. In some embodiments the gap may have a radial dimension greater than 0.005 mm and less than 0.5 mm, and an axial extent greater than 0.5 mm and less than 20 mm. The shaft may have a diameter greater than 5 mm and less than 100 mm.

As used herein, the term "fluid" may describe a liquid or a gas or either, unless context indicates otherwise (e.g., in the term "fluid-air separator", fluid refers to a liquid). In some embodiments the fluid is a cooling fluid, or a lubricating fluid, or a fluid (e.g., automatic transmission fluid) suitable for performing both cooling and lubrication. In the claims, "fluid" means liquid, except in the phrase "in fluid communication" in which it means either liquid or gas. In a seal, with one or more lips, that separates a fluid (e.g., a liquid) on one side from air (e.g., the atmosphere) on the other side, the "fluid side" of any lip (or of the seal) is the side facing toward the fluid, and the "air side" of any lip (or of the seal) is the side facing toward the air.

Figure 2:
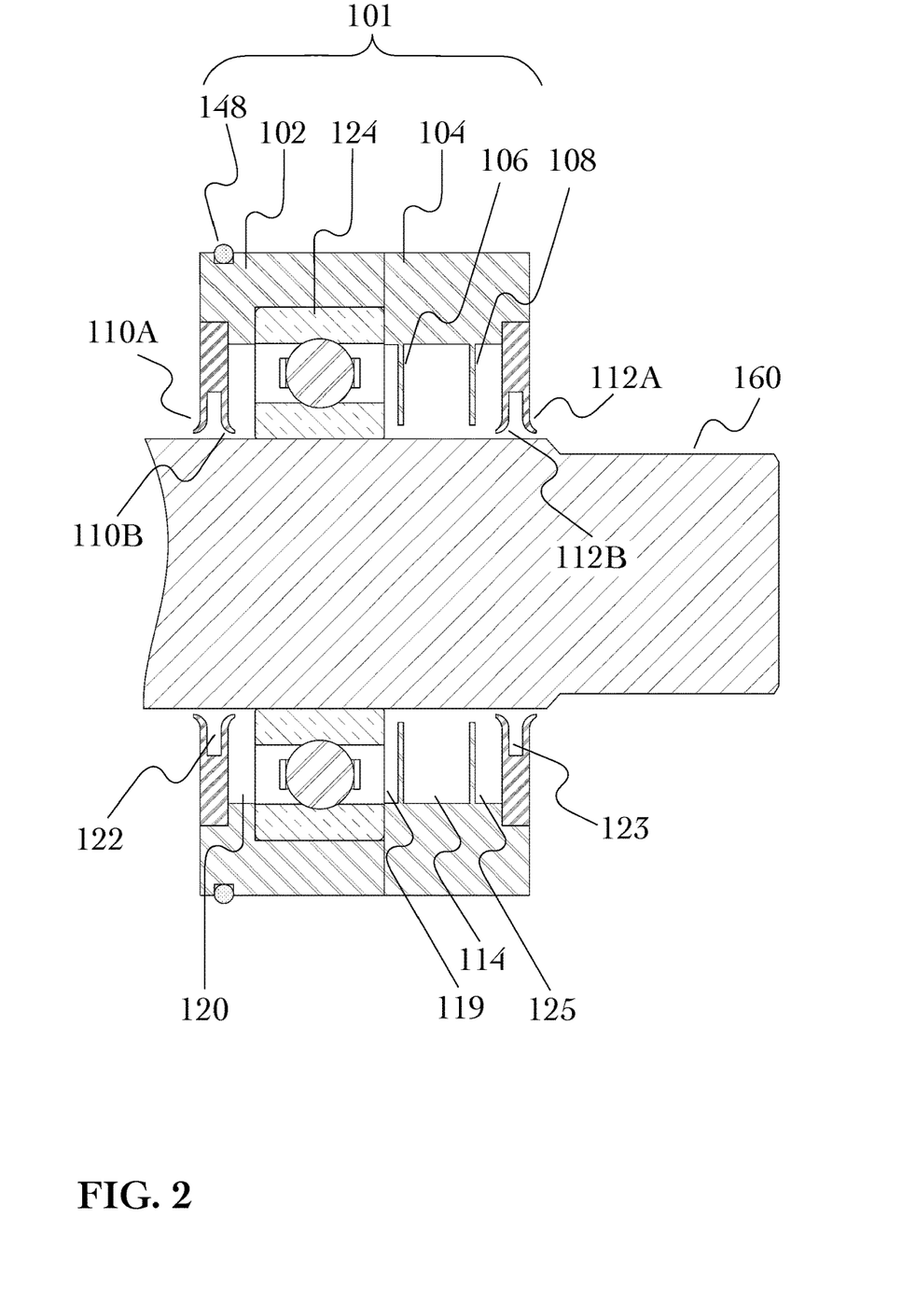
FIG. 2 is a cross-sectional view of a seal and bearing assembly on a shaft, according to an embodiment of the present invention.
Figure 3:
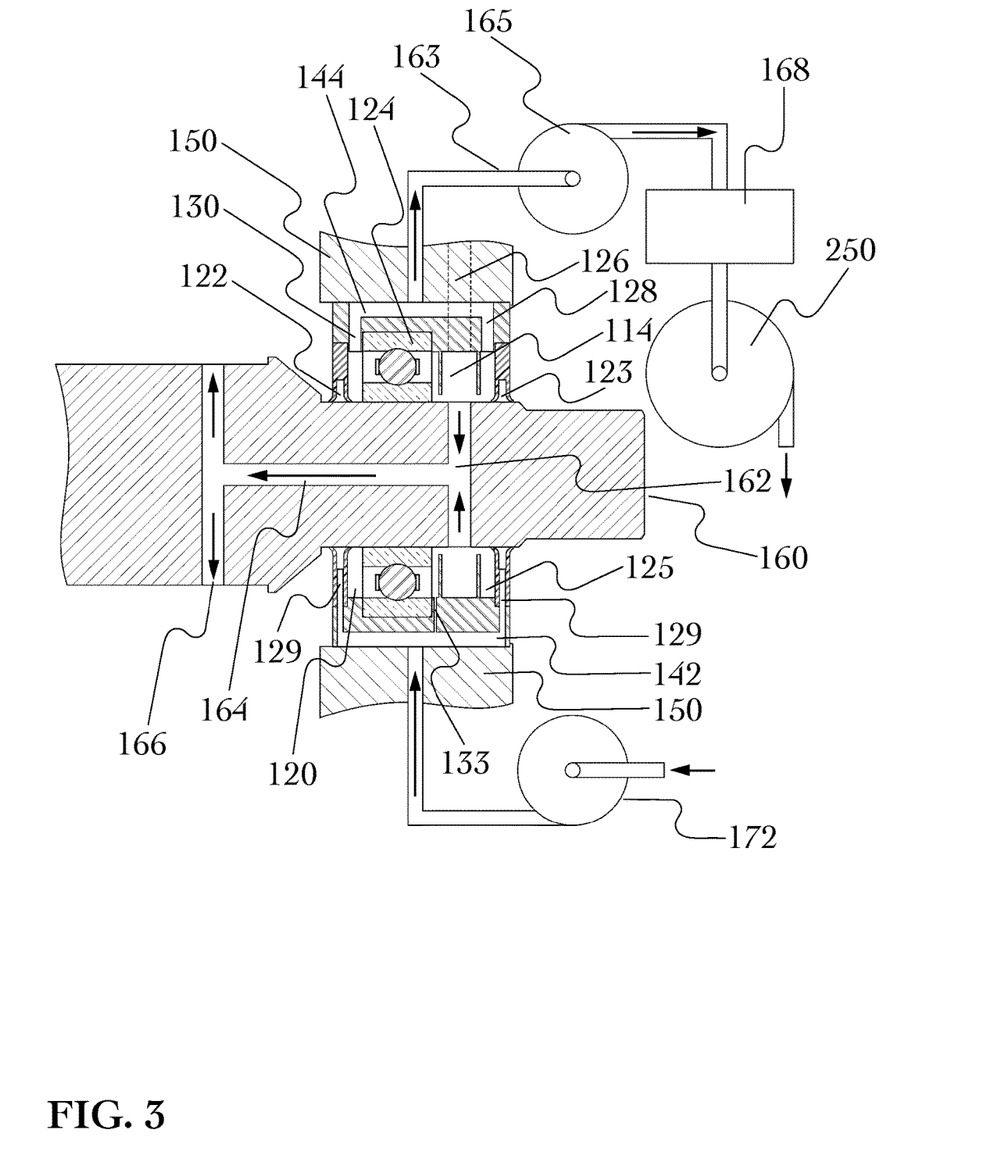
FIG. 3 is a cross-sectional and schematic view of a rotary fluid coupling system, according to an embodiment of the present invention.

Seals according to FIG. 1 may be combined, for example to form a rotary fluid coupling for communicating a liquid (e.g. oil) between a stationary environment and a rotating shaft, as illustrated in FIG. 2. Fluid is supplied to a flow cavity 114, e.g., through a radial hole 126 (FIG. 3), and from the flow cavity 114 it may flow into the shaft through a radial hole 162 (FIG. 3). The rotary fluid coupling includes a first fluid seal, to the right of the flow cavity 114, and a second fluid seal, to the left of the flow cavity 114, each of these two fluid seals acting as an obstacle to the escape of fluid from the flow cavity 114. The first fluid seal includes a first fluid-side lip 108 (which may be a rigid lip), immediately to the right of the flow cavity 114, a first air-side lip 112B, to the right of, i.e., on the air side of, the first fluid-side lip 108, and a first compressed air lip 112A, to the right of, i.e., on the air side of, the first air-side lip 112B. Each of the first air-side lip 112B and the first compressed air lip 112A may be a flexible lip; these two lips may be fabricated together, as a single part, as shown. The first fluid-side lip 108 is separated from the outer surface of the shaft 160 by a sufficiently small gap (a first fluid-side gap) that seepage of liquid through the first fluid-side gap, from the flow cavity 114 to a first recovery cavity 125 (from which the seeped fluid may be recovered, as described in further detail below), is small. The recovery cavity 125 is "positioned between" the first fluid-side lip 108 and the first compressed air lip 112A, and the recovery cavity 125 is "immediately axially between" the first fluid-side lip 108 and the first air-side lip 112B. The assembly that surrounds and supports the shaft in FIG. 2 (i.e., the assembly of parts illustrated in FIG. 2 except the shaft) may be referred to as a seal and bearing assembly 101.

Compressed air is supplied to a first compressed air cavity 123, from which it seeps through the gap between the first air-side lip 112B and the surface of the shaft 160, to (i) prevent liquid from seeping through the same gap, in the opposite direction, and (ii) to drive liquid out of the first recovery cavity 125 through one or more first liquid recovery holes 128 (FIGS. 3 and 5) through which the liquid returns to a fluid-air separator 168 (FIG. 3) or to a reservoir. A scavenge pump 165 (FIG. 3) may also be employed to evacuate the first recovery cavity 125. In some embodiments the flow of compressed air is sufficient to drive liquid out of the first recovery cavity 125, and the scavenge pump 165 may be absent. The air pump 172 or "compressor" (FIG. 3) handles air only; this may simplify the pump design, over that of the scavenge pump 165, which may handle a combination of air and liquid. Pumping power levels may be very small, e.g., on the order of 1.0 W, if the shaft diameter is on the order of 25 mm.

Each of the first air-side lip 112B and the first compressed air lip 112A may be in contact with the shaft 160 when compressed air is not supplied to the first compressed air cavity 123, and, in operation, the compressed atmospheric air supplied to the first compressed air cavity 123 may be supplied under sufficient pressure to cause a small gap to form between each of first air-side lip 112B and the first compressed air lip 112A (both of which may be soft or flexible lip seals) and the shaft 160.

In some embodiments, the second fluid seal includes a second fluid-side lip 106 immediately to the left of the flow cavity 114, a second air-side lip 110B, to the left of, i.e., on the air side of, the second fluid-side lip 106, and a second compressed air lip 110A, to the left of, i.e., on the air side of, the second air-side lip 110B. In addition to being supplied to the first compressed air cavity 123, compressed atmospheric air is supplied to second and third compressed air cavities 122, 119. This compressed air may be supplied through one or more air supply holes 129, 133 (FIG. 5) opening into the compressed air cavities 123, 122, 119. The operation of the second fluid seal is similar to that of the first fluid seal, except that the second fluid seal includes a bearing 124 (e.g., a ball bearing) between the second fluid-side lip 106 and the second air-side lip 110B. The compressed air supplied to the third compressed air cavity 119 (which is between the second fluid-side lip 106 and the bearing 124) drives liquid (that seeps through the second fluid-side gap between second fluid-side lip and the outer surface of the shaft 160) through the bearing into the second recovery cavity 120, from which it is driven (by the positive pressure supplied from the second and third compressed air cavities 122, 119 on either side of it) back to a liquid reservoir or fluid-air separator.

The connection from the air supply channel to the third compressed air cavity 119 may be an orifice sized to provide liquid and air to the bearing in a proportion suitable for adequate lubrication without producing excessive viscous drag. In some embodiments, the orifice has a diameter of about 1 mm. In other embodiments, the diameter may be smaller, e.g., as small as 0.2 mm or smaller, or it may be larger e.g., as large as 1.5 mm or larger. The first recovery cavity 125 and the second recovery cavity 120 may be connected to a liquid reservoir by a channel or other liquid recovery passage, e.g., a line 163, (which may be a pipe or tube as shown in FIG. 3), allowing liquid and air to return to the liquid reservoir or to the fluid-air separator (which may also act as a liquid reservoir).

In some embodiments, the rotary fluid coupling of FIG. 2 includes a first seal housing element 104 that is press fitted within a bore in the electric motor end bell 150 (FIG. 4), and a second seal housing element 102 that is press fitted to the bearing outer race and that slip fits within the end bell bore, and is sealed to the end bell bore by an O-ring 148.

The embodiment of FIG. 2 may provide low drag, as well as further advantages. For example, shaft drag loss may be quite small, e.g., less than 10 W, for a 25 mm shaft rotating at 20,000 rpm. Foreign material may prevented from entering the first and second recovery cavities 125, 120 during nonoperation by action of the outer lip seals (e.g., as a result of the first and second compressed air lips 112A, 110A and/or the first and second air-side lips 112B, 110B being in contact with the shaft 160 during nonoperation), and during operation by action of positive air pressure applied to the outer compressed air cavities, i.e., the first and second compressed air cavities 123, 122. During operation, lip seal contact with the shaft may be eliminated by action of air flow. This may significantly reduce both lip seal wear and mechanical drag during operation. Bearing lubrication may be provided by a combination of leakage liquid (e.g., oil) and limited air flow which enters the third compressed air cavity 119. The ratio of air flow to oil flow may be controlled such that lubrication is optimized. It will be understood that the rotary fluid coupling of FIG. 2 may be used either on the pump end of the shaft or on the recovery end of the shaft, and the fluid may flow from the flow cavity 114 into the shaft, or from the shaft into the flow cavity. The respective rates of air and liquid leakage may be calculated using Equation (2).

FIG. 3 shows a sectional view of a rotary fluid coupling according to one embodiment, with the cutting plane selected to pass through a first pair of radial holes 162 in the shaft 160, an axial hole 164 in the shaft 160, a second pair of radial holes 166 in the shaft 160, liquid recovery holes 128, 130, air supply holes 129, 133, and axial passages, or "flow slots" 142, 144 (described in further detail below) providing axial connections between and to these radial holes. The scavenge pump 165 (which in some embodiments is absent) evacuates the first and second recovery cavities 125, 120 into the fluid-air separator 168, a main pump 250 draws fluid from the bottom of the fluid-air separator 168 and pumps it back into the flow cavity 114 (either at the end of the shaft 160 shown or at the opposite end). The air pump 172 provides compressed air to the compressed air cavities 123, 122, 119 (FIG. 2). In the embodiment illustrated in FIG. 3 the radial holes 162, 166 in the shaft 160 are through holes (i.e., pairs of holes separated azimuthally by 180 degrees) and the liquid recovery holes 128, 130 and the recovery flow slot 144 are separated azimuthally by 180 degrees from the air supply holes 129, 133 and the compressed air flow slot 142; in other embodiments the azimuthal separations may be different, so that a cross section taken with a cutting plane through the central axis of the system would not show all of these passages and holes simultaneously.

Figure 4:
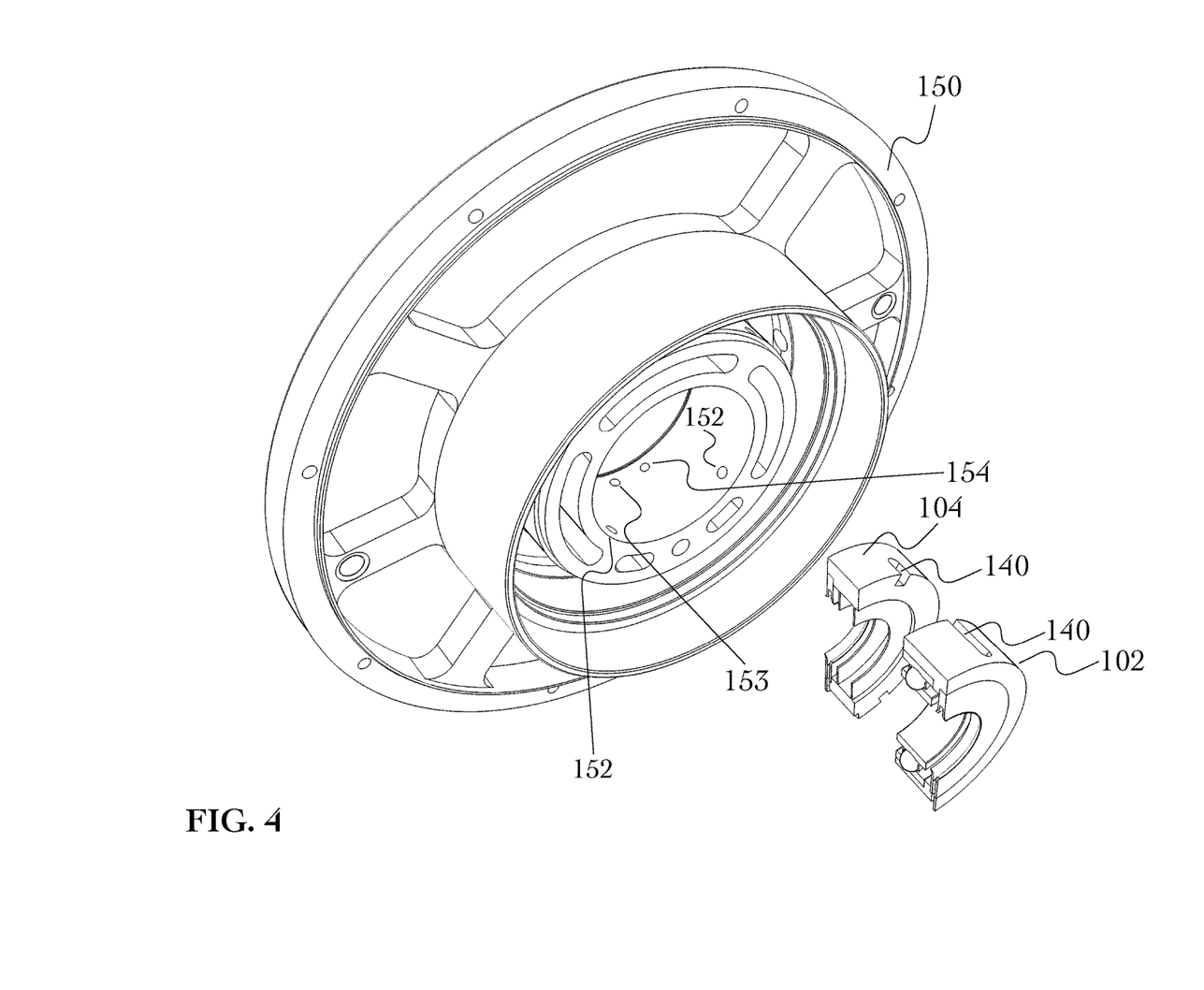
FIG. 4 is an exploded cutaway view of a seal and bearing assembly and an electric motor end bell, according to an embodiment of the present invention.

FIG. 4 is an exploded view of (i) a perspective view of an electric motor end bell 150 and (ii) an exploded cutaway view of the seal and bearing assembly 101, according to one embodiment. Fluid flowing to or from the flow cavity 114 (FIG. 3) flows radially through one or more radial end bell fluid holes 152, compressed air flowing to the compressed air cavities 123, 122, 119 flows through one or more radial end bell compressed air holes 153, and fluid and/or air from the recovery cavities 125, 120 (FIG. 2) flows through one or more radial end bell recovery holes 154. Air or fluid that flows radially through the radial end bell holes 152, 153, 154 flows axially through flow slots, such as the fluid flow slot 140 illustrated, or compressed air flow slots 142 (FIG. 5) or recovery flow slots 144 (FIG. 5), and from each flow slot into or out of one or more corresponding radial holes (e.g., liquid recovery holes 128, 130, or air supply holes 129, 133) in the seal and bearing assembly 101. If a radial end bell hole 152, 153, 154 is axially aligned with a corresponding radial hole in the seal and bearing assembly 101, a flow slot may not be needed. If there is an azimuthal misalignment between a radial end bell hole 152, 153, 154 and a corresponding radial hole in the seal and bearing assembly 101, an azimuthal flow slot may be used, and if a radial end bell hole 152, 153, 154 and a corresponding radial hole in the seal and bearing assembly 101 are misaligned both axially and azimuthally then a flow slot that is neither entirely axial nor entirely azimuthal (e.g., a flow slot that is helical, or that has an axial portion and an azimuthal portion) may be used.

Figure 5:
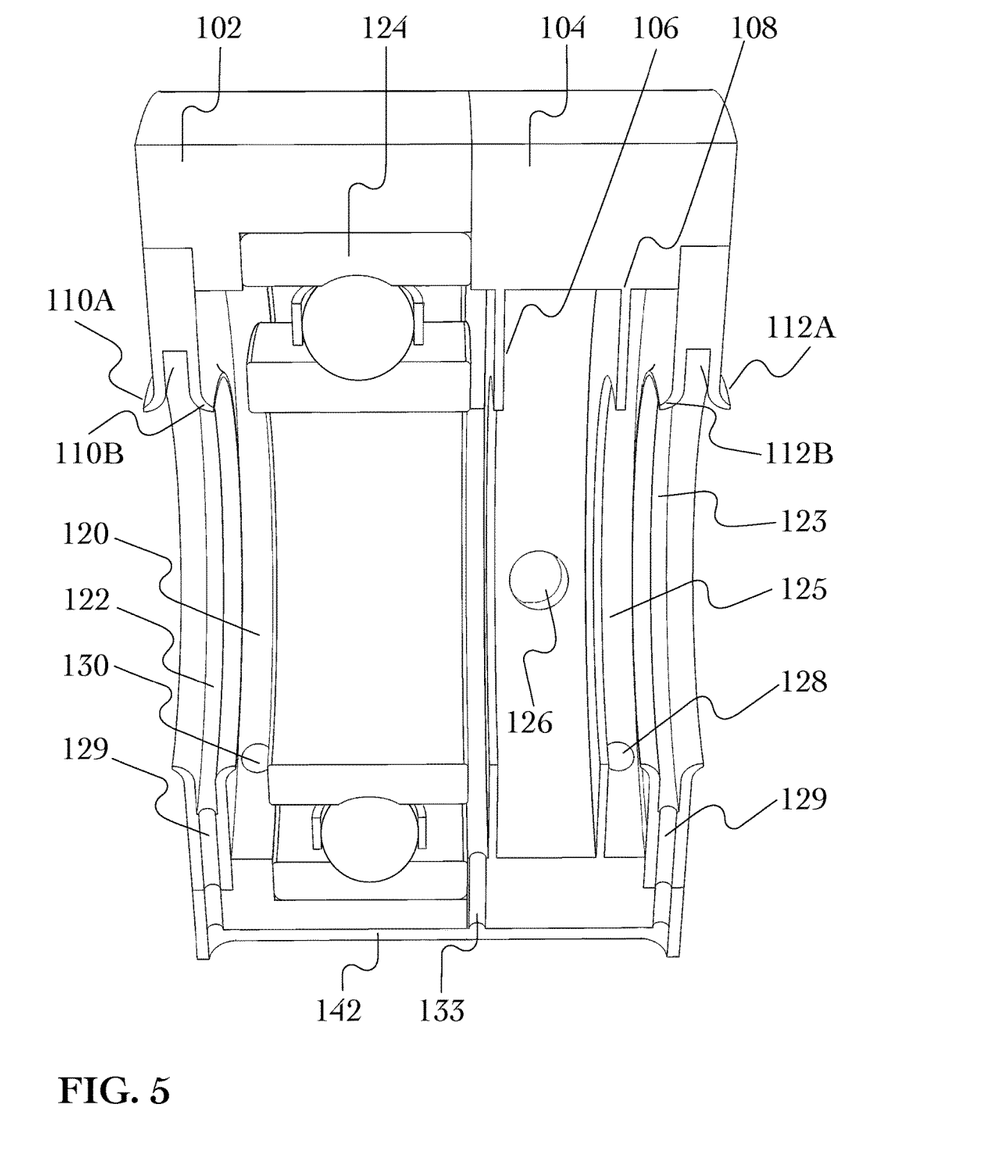
FIG. 5 is a cutaway perspective view of a seal and bearing assembly, according to an embodiment of the present invention.
Figure 6:
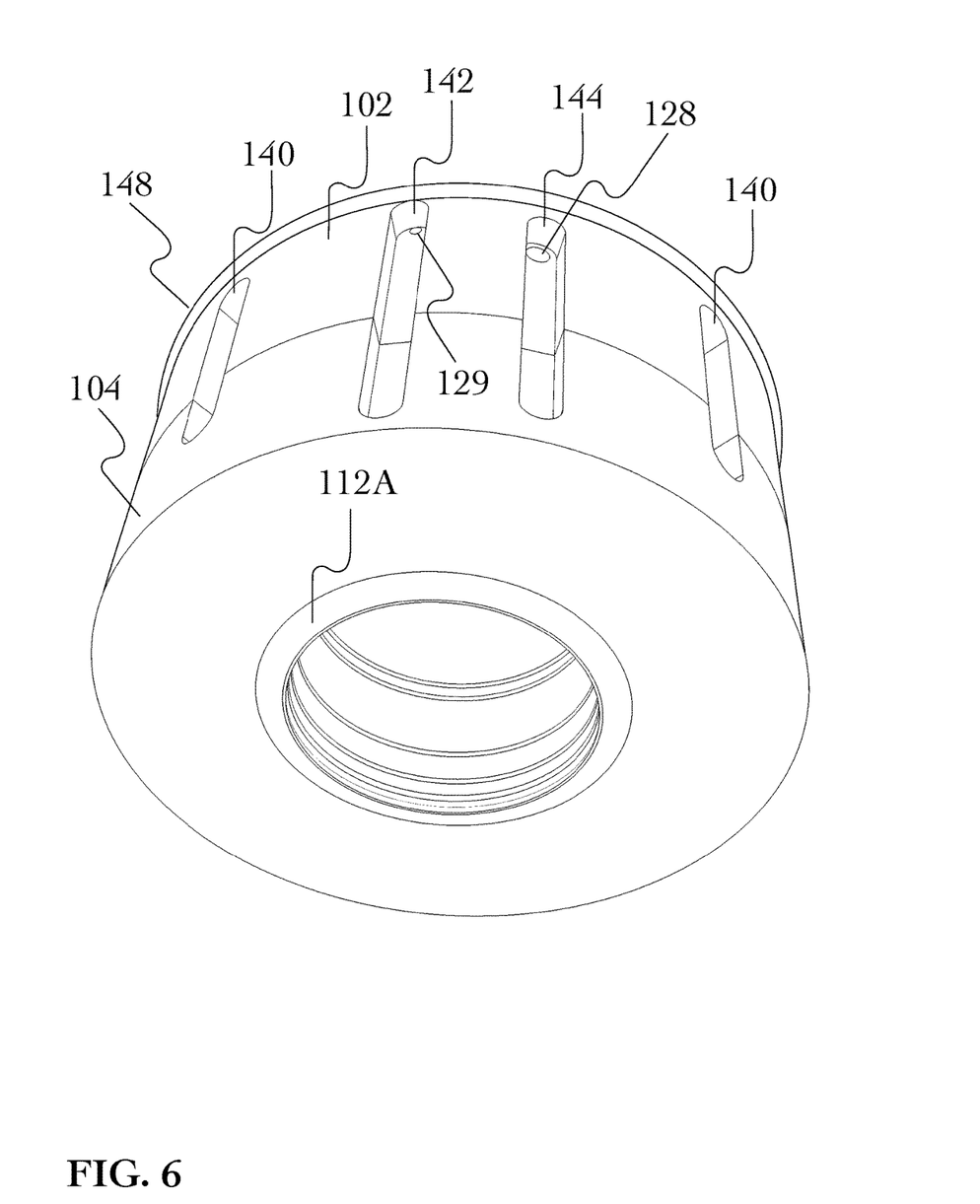
FIG. 6 is a perspective view of a seal and bearing assembly, according to an embodiment of the present invention.

FIG. 5 is a cutaway perspective view showing features described above and illustrated in FIGS. 2 and 3. FIG. 6 is a perspective exterior view of the seal and bearing assembly 101, showing a compressed air flow slot 142, two fluid flow slots 140, a recovery flow slot 144, and the O-ring 148.

Figure 7:
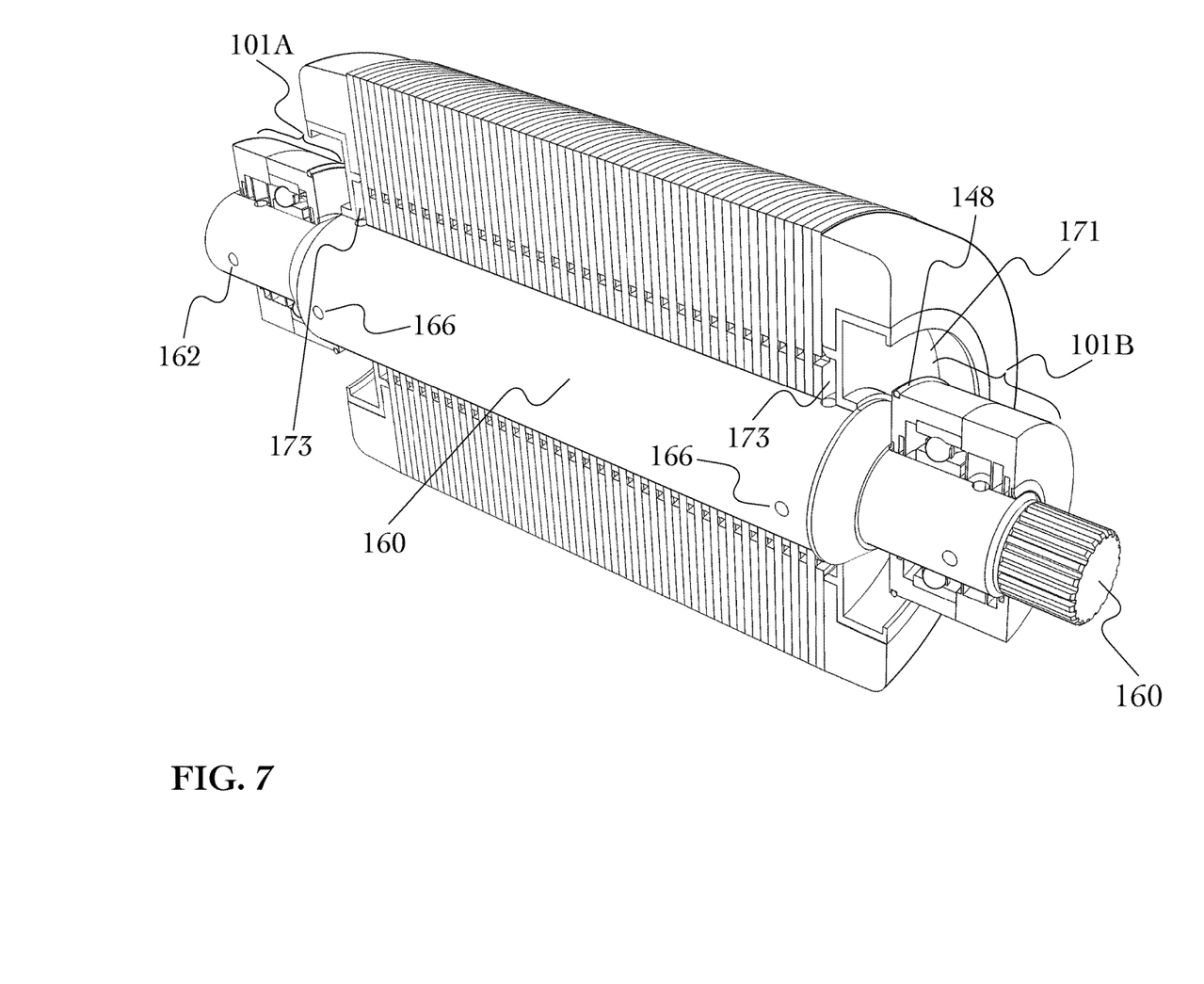
FIG. 7 is a cutaway perspective view of an electric motor rotor and two seal and bearing assemblies, according to an embodiment of the present invention.

FIG. 7 depicts a liquid-cooled motor rotor according to one embodiment, and a pair of rotary fluid couplings, each of which includes a seal and bearing assembly 101. Fluid flows into a first axial hole 164 (FIG. 3; not visible in FIG. 7) in the motor rotor shaft 160 at a first rotary fluid coupling including a first seal and bearing assembly 101A, at a first end of the motor rotor. The fluid then flows generally axially through the motor rotor and back out of the motor rotor shaft at a second rotary fluid coupling (at a second end of the motor rotor) including a second seal and bearing assembly 101B. In other embodiments the fluid flows in the opposite direction. Each of the seal and bearing assemblies 101A, 101B illustrated in FIG. 7 has (like the seal and bearing assembly of FIG. 6) first and second first compressed air lips that are flexible lips, and the remainder of the lips (the first and second fluid-side lips, and the first and second air-side lips) are rigid. In other embodiments, other combinations of rigid and/or flexible lips may be used. In some embodiments, the non-drive end of the shaft 160 may have a significantly smaller diameter, and may have a rotary fluid coupling with simple (single) lip seals.

Within the motor rotor, the fluid flows through the first axial hole 164 (as mentioned above), exits the motor rotor shaft through one or more radial holes 166 in the shaft 160 and flows through radial ports 173 located in a rotor end plate 171 at the first end of the motor rotor. After passing through the body of the rotor (e.g., through cooling passages in the laminations of the rotor), fluid then passes through radial ports 173 located in a rotor end plate 171 at the second end of the motor rotor, through radial holes 166 in the shaft 160 to a second axial hole 164 at the second end of the motor rotor, and back out of the motor rotor shaft at a second rotary fluid coupling. The fluid exiting the second fluid coupling may return to a reservoir or to the fluid-air separator 168.

Figure 8:
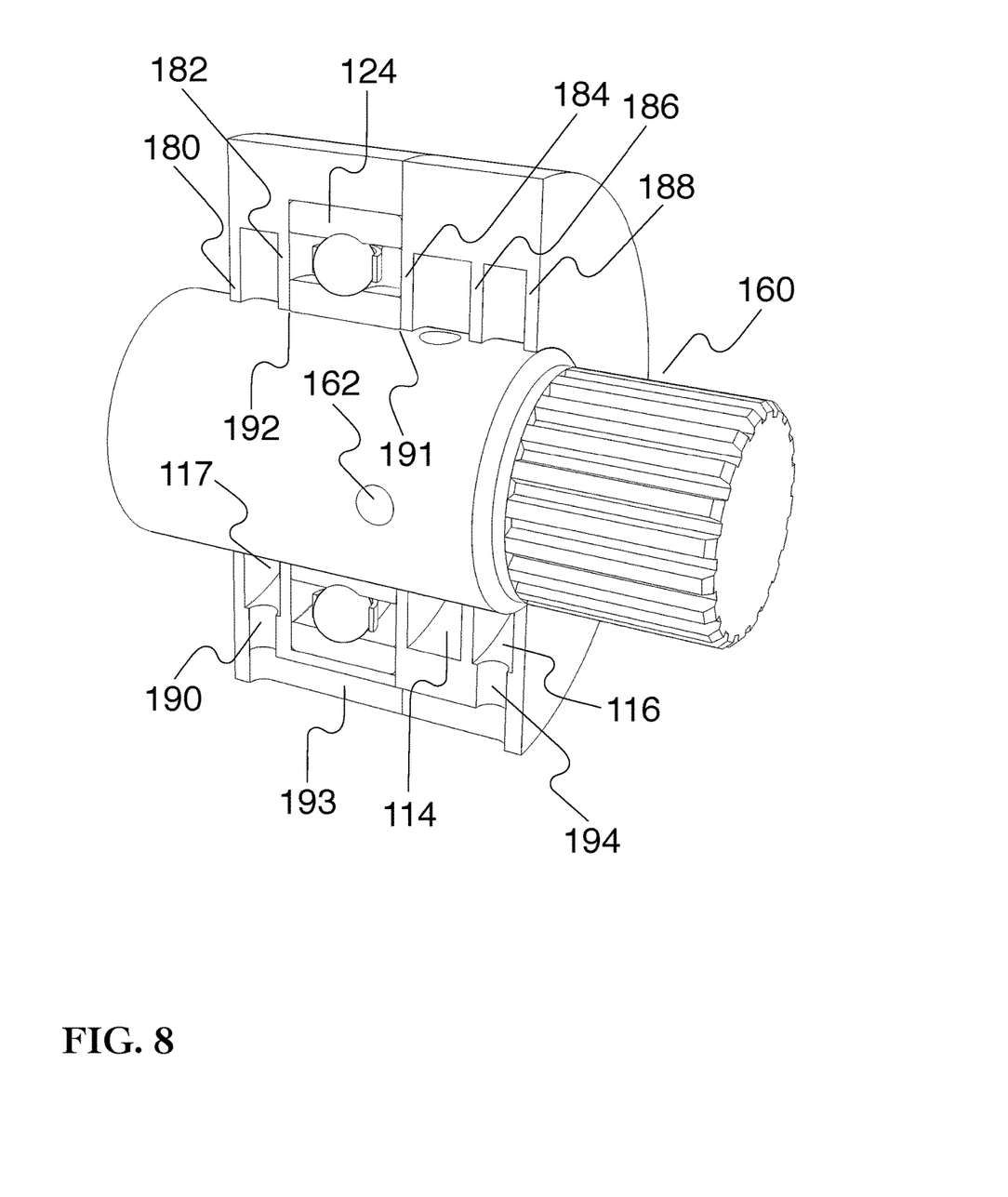
FIG. 8 is a cutaway perspective view of a seal and bearing assembly on a shaft, according to an embodiment of the present invention.

FIG. 8 shows a rotary fluid coupling employing fewer lip seals than the embodiment of FIG. 2. As in the embodiment of FIG. 2, fluid flows through the flow cavity 114 and through radial holes 162 in the shaft 160 to flow into or out of an axial hole 164 (not visible in FIG. 8) in the shaft 160. A first fluid seal includes a first fluid side lip 186 and a first air-side lip 188, each of which may be a rigid lip. A uniform gap, or "fluid-side gap" is formed between the first fluid side lip 186, with a radial dimension equal to $g_1$. The shaft diameter is D, the length of the first fluid side lip 186 is $L_1$, and the fluid pressure of the liquid, relative to atmospheric, is $P_0$. The first fluid side lip 186 and the first air-side lip 188 form, between them, a first recovery cavity 116 in which a partial vacuum is maintained by action of a scavenge pump 165 (which may be a relatively small pump). The gap, or "air-side gap" associated with the first air-side lip 188 is $g_2$, and the length of the first air-side lip 188 is $L_2$. Drag torque associated with the first air-side lip 188 may be negligible since the air-side gap is filled with air, the viscosity of which may be about one thousandth that of typical liquids.

To reduce air flow through the air-side gap, $g_2$ may be maintained as small as possible. If $g_2$ is held at 0.025 mm (0.001"), and a vacuum of 7000 Pa (1 psi) is maintained, air flow, as calculated by Equation (2) (using $\mu=0.00002$ Pa-seconds), is about 3 liters per minute for a shaft diameter of 25 mm; air velocity through $g_2$ is approximately 25 m/second. The associated theoretical pumping power is 0.35 W. Scavenge flow consists of a mixture of fluid and air. In a manner similar to that illustrated in FIG. 3, a fluid-air separator 168 may be used to separate air from the fluid. This separator may be connected such that it serves to also remove air from the primary flow. A main pump 250 may draw liquid from the bottom of the fluid-air separator. Alternatively, the fluid-air separator can be connected such that it deals only with the scavenge flow and is not involved with the primary flow. In some embodiments, the scavenge flow (which, as mentioned above, consists of a mixture of fluid and air) may flow directly into a fluid-air separator without first flowing through a pump. In this embodiment the separator may be a sealed container the interior of which is at a pressure lower than atmospheric pressure. The container may have an inlet (connected to one or more recovery cavities) for receiving the scavenge flow, an air outlet, at or near the top of the container, evacuated by an air pump, and a fluid outlet, at or near the bottom of the container, evacuated by a fluid pump.

In some embodiments, instead of being a rigid lip, the first air-side lip 188 is a flexible lip that flexes or deflects into the first recovery cavity 116 when a partial vacuum is present in the first recovery cavity 116, such that a small air-side gap, $g_2$ is formed and a small air ingress occurs which prevents fluid escape through $g_2$, and which also avoids contact, during operation, between the flexible first air-side lip 188 and the shaft 160. The actual size of $g_2$ is determined by the stiffness of the flexible first air-side lip 188 and the rate of air flow through $g_2$. In some embodiments the flexible first air-side lip 188 does not encounter frictional wear as contact with the shaft occurs only when the shaft is at rest. Furthermore, since the flexible first air-side lip 188 is not in contact with the shaft during rotation, there is virtually no drag associated with the flexible first air-side lip 188; the only drag is due to air viscosity within $g_2$. The first air-side lip 188 lip may however be in contact with the shaft when the scavenge pump is not operated and differential air pressure is zero. This feature may be used to prevent fluid leakage when the system is not operating, i.e., when the shaft rotation rate and fluid pressure are both zero.

The scavenge pump 165 associated with the embodiments of FIGS. 3 and 8 may include (e.g., consist of) the combination of a fixed displacement pump and a DC brushless electric motor. As such, the pump flow rate may be controlled by controlling the speed of the brushless motor. In the embodiment of FIG. 8, the flow rate of the scavenge pump may largely determine the size of the gap $g_2$.

The rotary fluid coupling of the embodiment of FIG. 8 includes, as illustrated, a second fluid seal including a bearing partition lip 184, a second fluid-side lip 182 and a second air-side lip 180. The second fluid side lip 182 and the second air-side lip 180 form, between them, a second recovery cavity 117 in which a partial vacuum is maintained by action of the scavenge pump 165. The bearing partition lip 184 limits the rate of liquid flow to the bearing and prevents turbulence generated by the bearing 124 from interfering with flow in the flow cavity 114. Fluid that seeps through the gap between the bearing partition lip 184 and the shaft 160 flows through a first axial gap 191 between the bearing partition lip 184 and the inner race of the bearing into the space between the inner and outer races of the bearing, through a second axial gap 192 between the inner race of the bearing and the second fluid-side lip 182, and through the gap between the second fluid-side lip 182 and the shaft 160, into the second recovery cavity 117. Like the first air-side lip 188, the second air-side lip 182 may be a flexible lip that flexes or deflects into the second recovery cavity 117 when a partial vacuum is present in the second recovery cavity 117.

In some embodiments the bearing is full of fluid. In other embodiments, a vent passage with a flow control orifice may allow air from inside the machine (which may be an electric motor) to flow into the space between the inner and outer races of the bearing, and the space between the inner and outer races of the bearing may include air and fluid, with a proportion of fluid that is sufficient for lubrication without producing unacceptable levels of viscous drag.

The first and second recovery cavities 116, 117 may be connected to an axial recovery slot 193 by respective axial holes 194, 190. The recovered fluid may be drawn from the recovery cavities through these passages, and through corresponding passages (e.g., one or more radial holes opening into the axial recovery slot 193) in an end bell into which the assembly of FIG. 8 may be fitted.

Although exemplary embodiments of a dynamic fluid seal have been specifically described and illustrated herein, many modifications and variations will be apparent to those skilled in the art. Accordingly, it is to be understood that a dynamic fluid seal constructed according to principles of this invention may be embodied other than as specifically described herein. The invention is also defined in the following claims, and equivalents thereof.

What is claimed is:

1. A rotary fluid coupling system, comprising:
    a rotor shaft;
    a first fluid seal around the rotor shaft;
    a second fluid seal around the rotor shaft; and
    a flow cavity located axially between the first fluid seal and the second fluid seal and in fluid communication with and overlapping a hole in the rotor shaft,
        the first fluid seal including:
            a rigid lip surrounding the rotor shaft;
            a first flexible lip and a second flexible lip, each surrounding the rotor shaft;
            a recovery cavity, positioned axially between the rigid lip of the first fluid seal and the first flexible lip of the first fluid seal, the recovery cavity of the first fluid seal configured to recover fluid escaping through a gap between the rigid lip of the first fluid seal and the rotor shaft; and
            a first compressed air cavity, between the first flexible lip of the first fluid seal and the second flexible lip of the first fluid seal, the first compressed air cavity of the first fluid seal being in fluid communication with a source of compressed air through one or more supply holes in the first fluid seal, the one or more supply holes located between the first flexible lip of the first fluid seal and the second flexible lip of the first fluid seal,
        the second fluid seal including:
            a rigid lip surrounding the rotor shaft;
            a first flexible lip surrounding the rotor shaft; and
            a recovery cavity, positioned between the first flexible lip of the second fluid seal and the rigid lip of the second fluid seal, the recovery cavity of the second fluid seal configured to recover fluid escaping through a gap between the rigid lip of the second fluid seal and the rotor shaft,
    wherein the flow cavity is immediately axially between the rigid lip of the first fluid seal and the rigid lip of the second fluid seal.

2. The rotary fluid coupling system of claim 1, the second fluid seal further comprising: a second flexible lip surrounding the rotor shaft; and a first compressed air cavity, between the first flexible lip of the second fluid seal and the second flexible lip of the second fluid seal, the first compressed air cavity of the second fluid seal being in fluid communication with the source of compressed air.

3. The rotary fluid coupling system of claim 2, further comprising a bearing on the rotor shaft and between the first flexible lip of the second fluid seal and the rigid lip of the second fluid seal.

4. The rotary fluid coupling system of claim 3, the second fluid seal further comprising a second compressed air cavity between the rigid lip of the second fluid seal and the bearing, the second compressed air cavity being in fluid communication with the source of compressed air.

5. The rotary fluid coupling system of claim 1, further comprising a scavenge pump having an inlet in fluid communication with the recovery cavity of the first fluid seal.

6. The rotary fluid coupling system of claim 1, wherein the first flexible lip of the first fluid seal is configured:
    to flex away from the rotor shaft to form a gap between the first flexible lip of the first fluid seal and the rotor shaft when a pressure difference exists between a first side of the first flexible lip of the first fluid seal and a second side of the first flexible lip of the first fluid seal, a pressure on the first side of the first flexible lip of the first fluid seal being greater than a pressure on the second side of the first flexible lip of the first fluid seal; and
    to contact the rotor shaft when the pressure on the first side of the first flexible lip of the first fluid seal is not greater than the pressure on the second side of the first flexible lip of the first fluid seal.

7. The rotary fluid coupling system of claim 1, further comprising at least one of:
    a scavenge pump configured to pump fluid, air, or a combination of fluid and air from the recovery cavity of the first fluid seal;
    a fluid-air separator; and
    a main pump.

8. The rotary fluid coupling system of claim 1, wherein the gap between the rigid lip of the first fluid seal and the rotor shaft has a radial dimension greater than 0.005 mm and less than 0.5 mm, and an axial dimension greater than 0.5 mm and less than 20 mm, and wherein the rotor shaft has a diameter greater than 5 mm and less than 100 mm.

9. The rotary fluid coupling system of claim 4, wherein the second compressed air cavity of the second fluid seal is in fluid communication, through the bearing, with the recovery cavity of the second fluid seal.

10. A rotary fluid coupling system, comprising:
    a rotor shaft;
    a first fluid seal around the rotor shaft;
    a second fluid seal around the rotor shaft; and
    a flow cavity located axially between the first fluid seal and the second fluid seal,
        the first fluid seal including:
            a rigid lip surrounding the rotor shaft;
            a first flexible lip and a second flexible lip, each surrounding the rotor shaft, the first flexible lip of the first fluid seal and the second flexible lip of the first fluid seal being a monolithic seal pair;
a recovery cavity, positioned axially between the rigid lip of the first fluid seal and the first flexible lip of the first fluid seal, the recovery cavity of the first fluid seal configured to recover fluid escaping through a gap between the rigid lip of the first fluid seal and the rotor shaft; and
a first compressed air cavity, between the first flexible lip of the first fluid seal and the second flexible lip of the first fluid seal, the first compressed air cavity of the first fluid seal being in fluid communication with a source of compressed air through one or more supply holes in the first fluid seal, the one or more supply holes being located between the first flexible lip of the first fluid seal and the second flexible lip of the first fluid seal and in the monolithic seal pair of the first fluid seal.

11. An electric machine comprising:
a rotor having a plurality of fluid passages and a rotor shaft, the rotor shaft having an axial hole in fluid communication with the fluid passages; and
a first rotary fluid coupling,
the first rotary fluid coupling including:
  a first fluid seal around the rotor shaft;
  a second fluid seal around the rotor shaft; and
  a first flow cavity between the first fluid seal and the second fluid seal and in fluid communication with and overlapping a radial hole in the rotor shaft,
  the first fluid seal including:
    a rigid lip surrounding the rotor shaft;
    a first flexible lip and a second flexible lip, each surrounding the rotor shaft;
    a recovery cavity, positioned axially between the rigid lip of the first fluid seal and the first flexible lip of the first fluid seal, the recovery cavity of the first fluid seal configured to recover fluid escaping through a gap between the rigid lip of the first fluid seal and the rotor shaft; and
    a first compressed air cavity, between the first flexible lip of the first fluid seal and the second flexible lip of the first fluid seal, the first compressed air cavity of the first fluid seal being in fluid communication with a source of compressed air through one or more supply holes in the first fluid seal located between the first flexible lip of the first fluid seal and the second flexible lip of the first fluid seal,
  the second fluid seal including:
    a rigid lip surrounding the rotor shaft;
    a first flexible lip surrounding the rotor shaft; and
    a recovery cavity, positioned between the first flexible lip of the second fluid seal and the rigid lip of the second fluid seal, the recovery cavity of the second fluid seal configured to recover fluid escaping through a gap between the rigid lip of the second fluid seal and the rotor shaft,
wherein the first flow cavity is in fluid communication with the axial hole in the rotor shaft, and
wherein the first flow cavity is immediately axially between the rigid lip of the first fluid seal and the rigid lip of the second fluid seal.

12. The electric machine of claim 11, wherein the first flow cavity is in fluid communication with the axial hole in the rotor shaft through the radial hole in the rotor shaft.

13. The electric machine of claim 11, wherein:
the second fluid seal further includes:
  a second flexible lip surrounding the rotor shaft; and
  a second compressed air cavity, between the first flexible lip of the second fluid seal and the second flexible lip of the second fluid seal, the second compressed air cavity being in fluid communication with the source of compressed air.

14. The electric machine of claim 13, further comprising an air pump having an outlet in fluid communication with the first compressed air cavity and the second compressed air cavity.

15. The electric machine of claim 11, further comprising:
a second rotary fluid coupling in fluid communication with the fluid passages of the rotor; and
a main pump configured to pump fluid through the first rotary fluid coupling, the fluid passages of the rotor, and the second rotary fluid coupling.

16. The electric machine of claim 15, further comprising a fluid reservoir, wherein the main pump is configured to draw fluid from the fluid reservoir.

17. The electric machine of claim 15, wherein the second rotary fluid coupling includes:
a first fluid seal around the rotor shaft,
  the first fluid seal including:
    a rigid lip surrounding the rotor shaft;
    a first flexible lip surrounding the rotor shaft; and
    a recovery cavity, positioned between the rigid lip of the first fluid seal of the second rotary fluid coupling and the first flexible lip of the first fluid seal of the second rotary fluid coupling, the recovery cavity of the first fluid seal of the second rotary fluid coupling configured to recover fluid escaping through a gap between the rigid lip of the first fluid seal of the second rotary fluid coupling and the rotor shaft.

18. The electric machine of claim 17, wherein the first fluid seal of the second rotary fluid coupling further includes:
a second flexible lip surrounding the rotor shaft; and
a first compressed air cavity, between the second flexible lip of the first fluid seal of the second rotary fluid coupling and the first flexible lip of the first fluid seal of the second rotary fluid coupling, the first compressed air cavity of the first fluid seal of the second rotary fluid coupling being in fluid communication with a source of compressed air.

19. A rotary fluid coupling system, comprising:
a rotor shaft;
a first fluid seal around the rotor shaft;
a second fluid seal around the rotor shaft; and
a flow cavity located axially between the first fluid seal and the second fluid seal and in fluid communication with and overlapping a hole in the rotor shaft,
the first fluid seal including:
  a rigid lip surrounding the rotor shaft;
  a flexible seal including a first flexible lip and a second flexible lip, each surrounding the rotor shaft;
  a recovery cavity, positioned axially between the rigid lip of the first fluid seal and the flexible seal of the first fluid seal, the recovery cavity of the first fluid seal configured to recover fluid escaping through a gap between the rigid lip of the first fluid seal and the rotor shaft; and
  a first compressed air cavity, between the first flexible lip of the flexible seal and the second flexible lip of the flexible seal, the first compressed air cavity of the first fluid seal being in fluid communication with a source of compressed air through one or more supply holes in the flexible seal, the one or more supply holes located between the first flexible lip of the flexible seal and the second flexible lip of the flexible seal, the second fluid seal including:
  a rigid lip surrounding the rotor shaft;
  a flexible lip surrounding the rotor shaft; and
  a recovery cavity, positioned between the flexible lip of the second fluid seal and the rigid lip of the second fluid seal, the recovery cavity of the second fluid seal configured to recover fluid escaping through a gap between the rigid lip of the second fluid seal and the rotor shaft, wherein the flow cavity is immediately axially between the rigid lip of the first fluid seal and the rigid lip of the second fluid seal.

20. A rotary fluid coupling system, comprising:
a rotor shaft;
a first fluid seal around the rotor shaft;
a second fluid seal around the rotor shaft; and
a flow cavity located axially between the first fluid seal and the second fluid seal and in fluid communication with and overlapping a hole in the rotor shaft,
the first fluid seal including:
  a first rigid lip surrounding the rotor shaft;
  a second rigid lip and a flexible lip, each surrounding the rotor shaft;
  a recovery cavity, positioned axially between the first rigid lip of the first fluid seal and the second rigid lip of the first fluid seal, the recovery cavity of the first fluid seal configured to recover fluid escaping through a gap between the first rigid lip of the first fluid seal and the rotor shaft; and
  a first compressed air cavity, between the second rigid lip of the first fluid seal and the flexible lip of the first fluid seal, the first compressed air cavity of the first fluid seal being in fluid communication with a source of compressed air through one or more supply holes in the first fluid seal, the one or more supply holes located between the second rigid lip of the first fluid seal and the flexible lip of the first fluid seal, the second fluid seal including:
  a rigid lip surrounding the rotor shaft;
  a flexible lip surrounding the rotor shaft; and
  a recovery cavity, positioned between the flexible lip of the second fluid seal and the rigid lip of the second fluid seal, the recovery cavity of the second fluid seal configured to recover fluid escaping through a gap between the rigid lip of the second fluid seal and the rotor shaft, wherein the flow cavity is immediately axially between the first rigid lip of the first fluid seal and the rigid lip of the second fluid seal.

* * * * *